United States Patent
Proietti et al.

(10) Patent No.: US 8,929,930 B2
(45) Date of Patent: Jan. 6, 2015

(54) SYSTEM AND METHOD FOR INITIATING AUXILIARY FUNCTIONS IN A TELECOMMUNICATION NETWORK

(75) Inventors: Mario Proietti, Fullerton, CA (US); Daniel A. Lambert, Carlsbad, CA (US); Samuel Charles Knight, Del Mar, CA (US); John Thomas Moring, Encinitas, CA (US)

(73) Assignee: TechnoCom Corporation, Carlsbad, CA (US)

( * ) Notice: Subject to any disclaimer, the term of this patent is extended or adjusted under 35 U.S.C. 154(b) by 570 days.

(21) Appl. No.: 12/977,782

(22) Filed: Dec. 23, 2010

(65) Prior Publication Data
US 2012/0164992 A1    Jun. 28, 2012

(51) Int. Cl.
H04W 4/00 (2009.01)
H04M 3/42 (2006.01)
H04W 4/02 (2009.01)

(52) U.S. Cl.
CPC ...... *H04M 3/42357* (2013.01); *H04M 2242/15* (2013.01); *H04W 4/02* (2013.01)
USPC ............... 455/466; 455/404.1; 455/404.2; 455/425; 455/456.1; 455/456.6; 455/565; 455/566; 455/567; 379/142.01; 379/142.06; 379/142.1

(58) Field of Classification Search
None
See application file for complete search history.

(56) References Cited

U.S. PATENT DOCUMENTS

| | | | |
|---|---|---|---|
| 2006/0258376 A1* | 11/2006 | Ewell, Jr. | 455/456.6 |
| 2007/0049267 A1* | 3/2007 | Kota et al. | 455/423 |
| 2007/0202927 A1* | 8/2007 | Pfleging et al. | 455/567 |
| 2007/0270122 A1* | 11/2007 | Ewell, Jr. | 455/404.2 |
| 2008/0008157 A1* | 1/2008 | Edge et al. | 370/351 |
| 2009/0176477 A1* | 7/2009 | Kota et al. | 455/404.2 |
| 2009/0186596 A1* | 7/2009 | Kaltsukis | 455/404.2 |
| 2010/0093405 A1* | 4/2010 | Ewell et al. | 455/566 |
| 2010/0153207 A1* | 6/2010 | Roberts et al. | 705/14.41 |
| 2010/0296642 A1* | 11/2010 | Hidajat | 379/142.06 |
| 2011/0205053 A1* | 8/2011 | Chen et al. | 340/539.13 |

\* cited by examiner

*Primary Examiner* — Justin Lee
(74) *Attorney, Agent, or Firm* — Christie, Parker & Hale, LLP

(57) ABSTRACT

A method for initiating a service including initiating a communication to a destination according to an address of the destination; detecting the address during initiating of the communication; determining whether the detected address is associated with a trigger function; and triggering a request for the service when the detected address is associated with a trigger function. The request for the service is separate from the communication.

Figure 1:
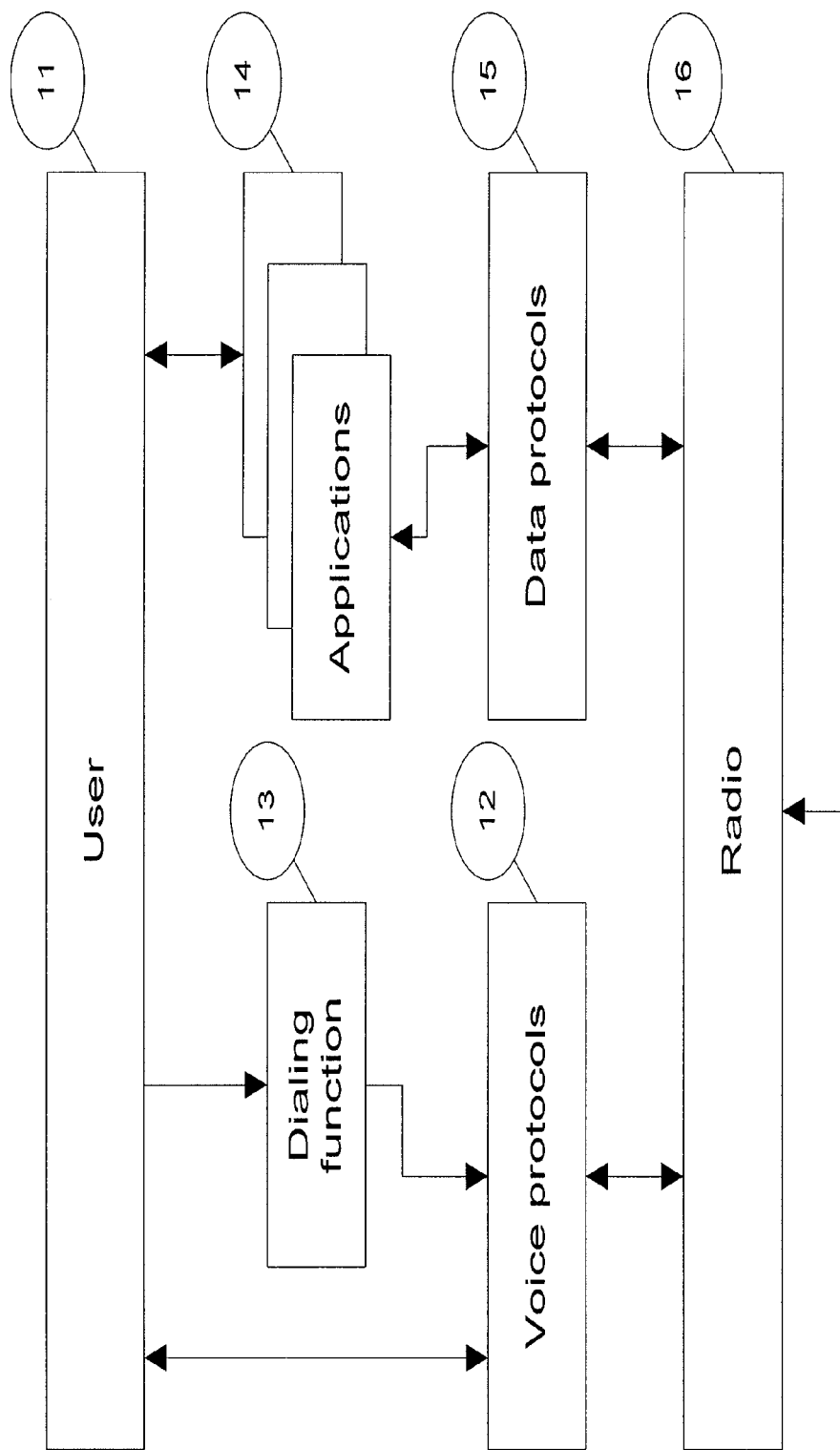
Figure 2:
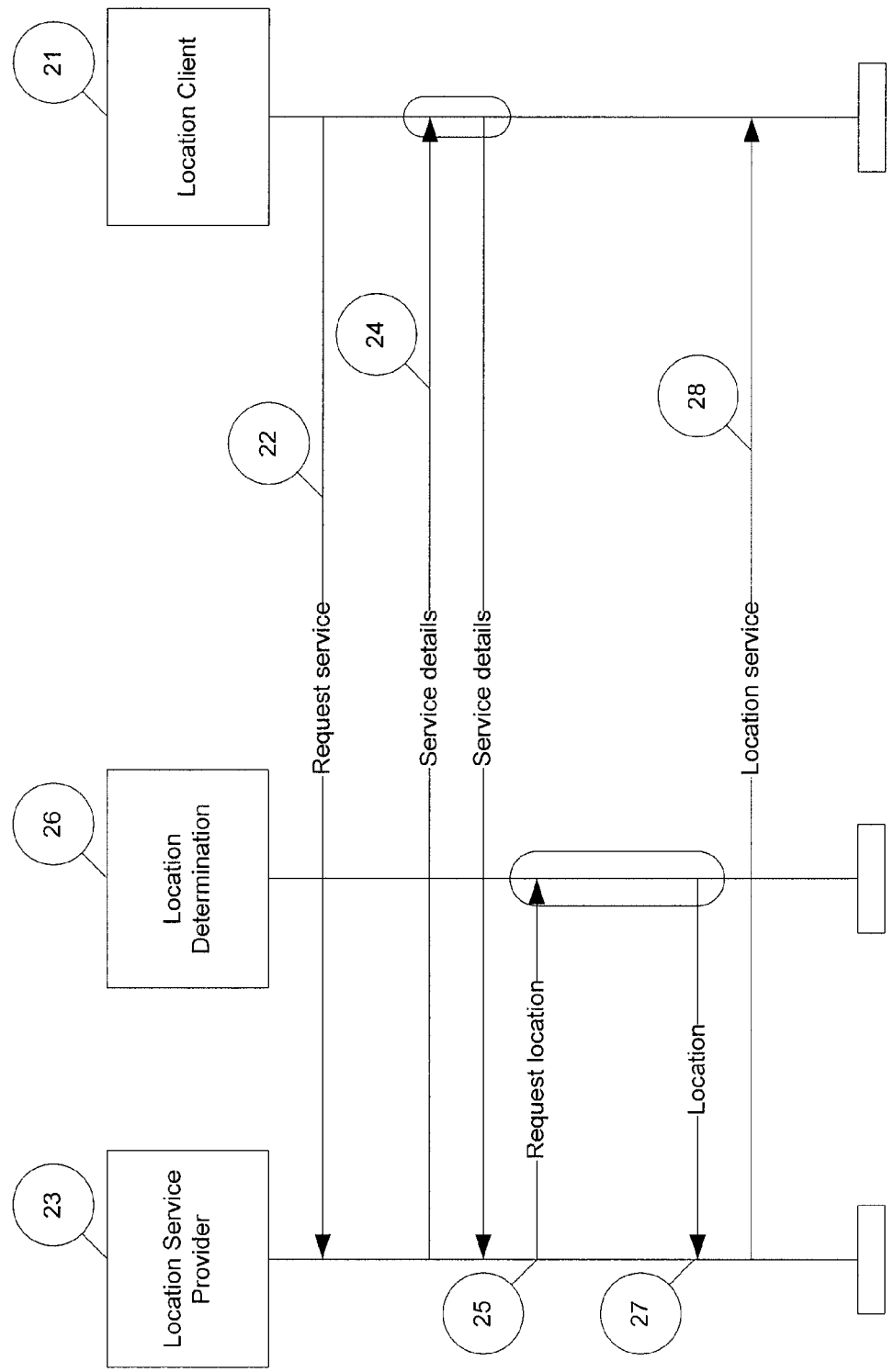
Figure 3:
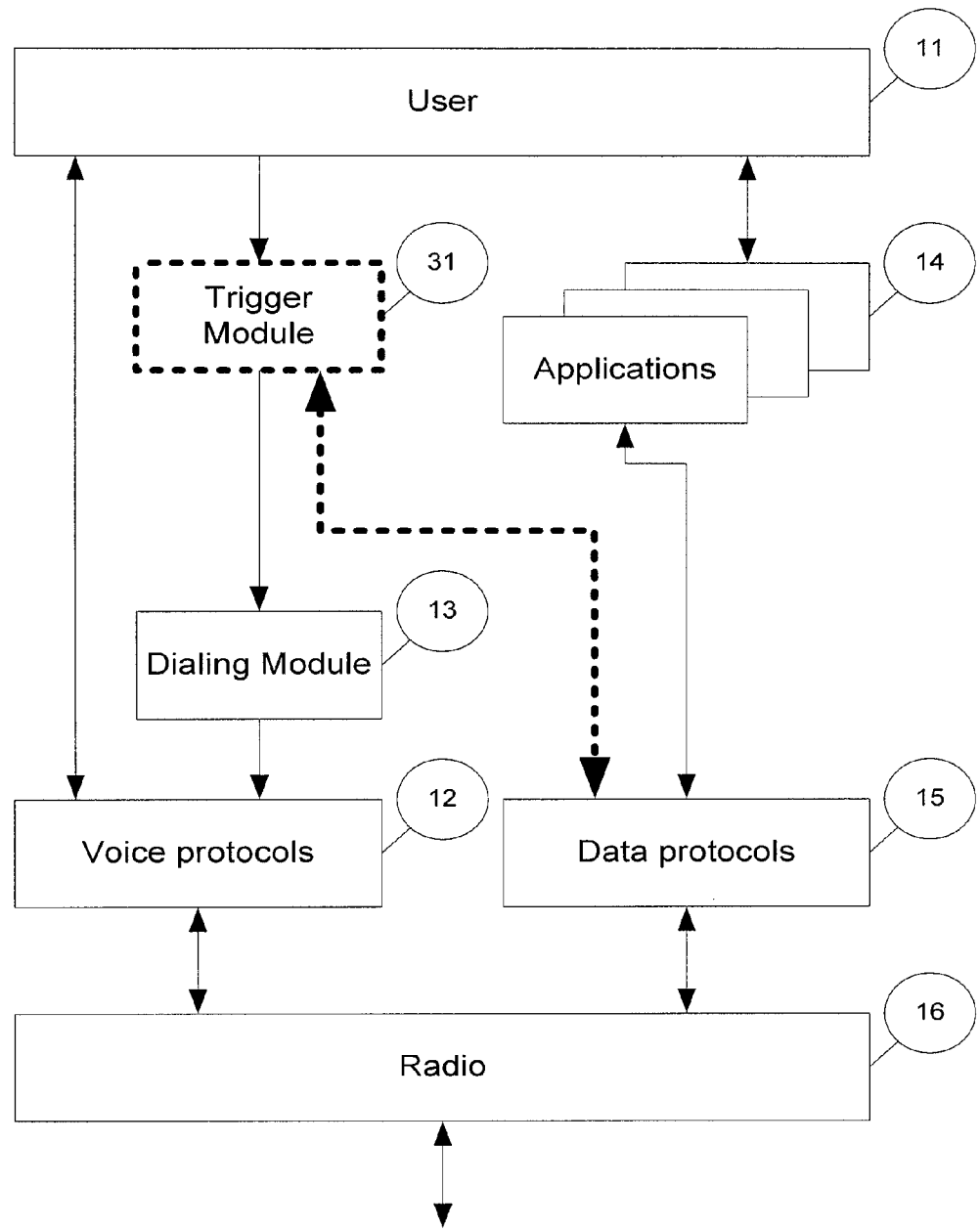
Figure 4:
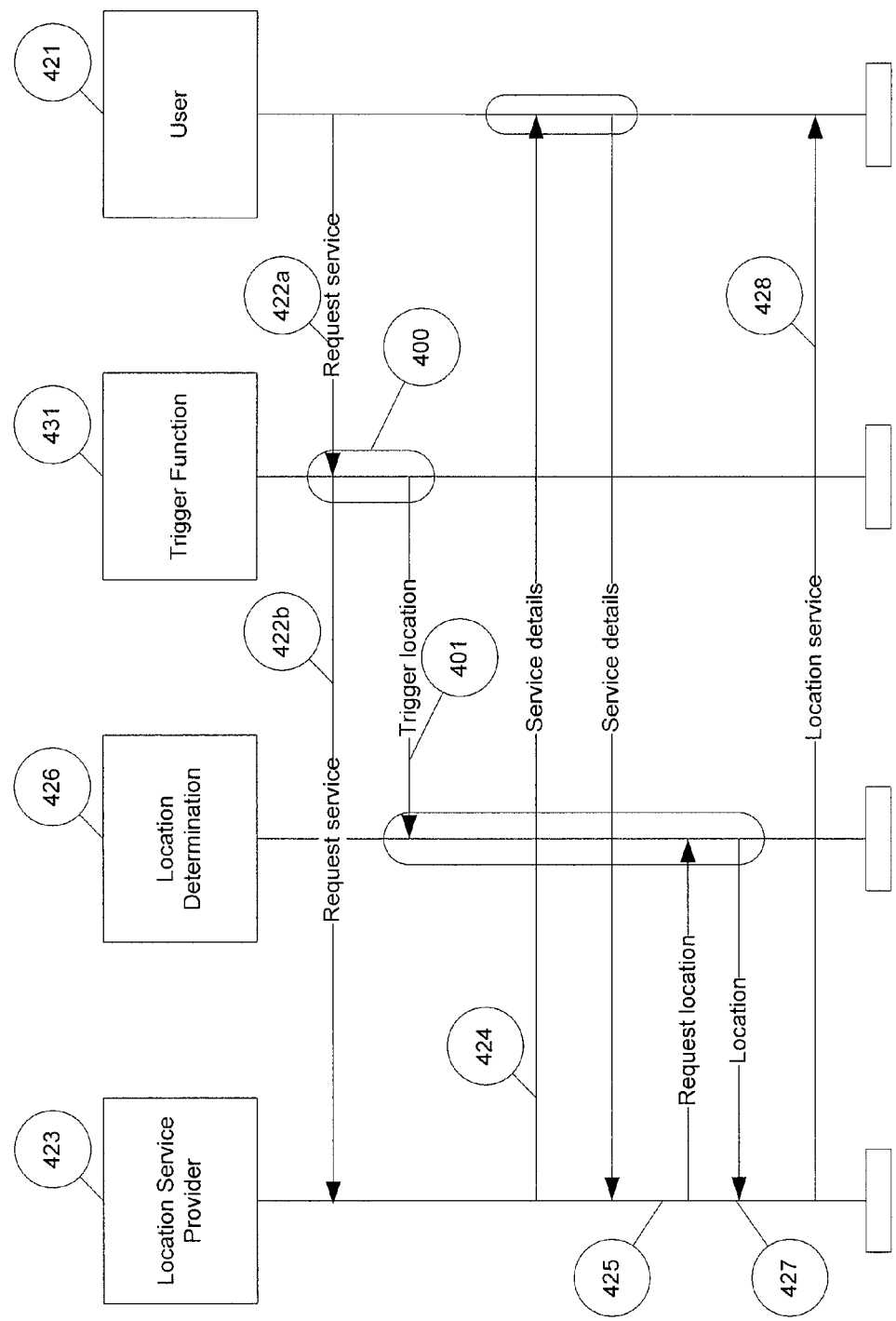

20 Claims, 5 Drawing Sheets

SYSTEM AND METHOD FOR INITIATING AUXILIARY FUNCTIONS IN A TELECOMMUNICATION NETWORK

FIELD OF INVENTION

The present invention relates to the field of mobile telephones and more specifically to a system and method for initiating auxiliary functions, such as location functions, in a telecommunication network.

BACKGROUND

Radiolocation of mobile devices developed in the last half of the 20$^{th}$ century, notably with the deployment of the Global Positioning System (GPS). Mobile phone technology evolved in a similar time frame. By the turn of the century, US cellular carriers deployed location-determination technology in their networks in support of emergency (E9-1-1) services. Subsequently, with the widespread use of smart phones and other portable computing devices, numerous applications utilizing location have been made available for such uses as direction finding, tracking individuals, and matching persons with nearby businesses.

FIG. 1 illustrates an exemplary functional block diagram of a typical data-enabled mobile phone. User 11 can communicate via voice protocols 12, using a dialing function 13 to set up the call. The user may also access applications 14, which may use data protocols 15 to access remote services. Both voice and data protocols make use of a radio 16 for communications. Examples of voice protocols include circuit and packet technologies. Examples of data protocols include circuit, packet, and message technologies, and data carried inband with the voice.

FIG. 2 shows information associated with an exemplary mobile application, according to the prior art. A user, via a location client 21, requests service 22 from a remote location service provider 23. For example, the client may wish the address of nearby retailers. The location client and location service provider exchange service details 24, for example, authorization information, accuracy of location desired (e.g., precise or general vicinity), preferred store brands, etc.

Subsequently, the location service provider requests the location 25 of the mobile unit from a location determination function 26. After the return of the location 27, the location service provider may perform the functions needed to satisfy the request, and provide the location service 28.

SUMMARY

In some embodiments, the present invention is a method for initiating a service. The method includes initiating a communication to a destination according to an address of the destination; detecting said address during initiating of said communication; determining whether said detected address is associated with a trigger function; and triggering a request for the service when said detected address is associated with a trigger function, wherein said request for the service is separate from said communication.

In some embodiments, the present invention is a method for initiating a service. The method includes initiating a communication to a destination according to an address of the destination; associating said address with a trigger function; detecting said address during initiating of said communication; and triggering a request for the service according to said association, wherein said request for the service is separate from said communication.

In some embodiments, the present invention is a mobile device including a dialing module for initiating a communication to a destination according to an address of the destination; a memory for storing a plurality of addresses, each address associated with a service; and a triggering module for detecting said address during initiating of said communication and triggering a request for the service according to said association, wherein said request for the service is separate from said communication.

The communication to the destination may be initiated by one or more of a mobile phone, a mobile computing device, and a computer. Furthermore, communication may be one or more of a phone call, a Short Message Service (SMS), a data call, a data access, and a website access.

BRIEF DESCRIPTION OF THE DRAWINGS

FIG. 1 shows a simplified block diagram of a smart phone, according to the prior art.

FIG. 2 is an information flow diagram showing the setup of a location service, according to the prior art.

FIG. 3 shows a simplified block diagram of a smart phone including a trigger function, according to some embodiment of the present invention.

FIG. 4 is an information flow diagram showing the setup of a location service using a trigger function, according to some embodiments of the present invention.

FIG. 5 is a diagram showing an exemplary logic performed by some embodiments of the present invention.

DETAILED DESCRIPTION

In some embodiments, the present invention initiates a service by a trigger. The service is associated with a communication between an originator using a mobile communication device and a remote party. The communication is initiated based on the address (which may be a phone number, IP address, or other identifier) of the remote party. The trigger detects the address of the remote party during the initiation of the communication and determines that the address of the remote party meets some address criteria. Then, based on the determination, the trigger initiates an action (for example, a service) separate from the communication.

FIG. 3 shows a simplified block diagram of a smart phone (just by way of example, but may also be another type of communications device) including a trigger module, according to some embodiment of the present invention. As shown, a new element, the trigger module 31 has been added. The purpose of the trigger module, as explained in more detail below, is to observe dialing activity that meets certain criteria, and to take appropriate action. The action is indicated by the dotted line from the trigger module 31 to the data protocols 15, where the action in this example is a communication with a remote entity over the data channel. The functional operation of the dialing module 13 is not affected. Note that the trigger module is shown between the user interface and the dialing module; it could as well be placed between the dialing module and the voice protocols, or incorporated into the dialing module, depending on implementation considerations.

FIG. 4 is an information flow diagram showing the setup of a location service using a trigger module, according to some embodiments of the present invention. A user 421 requests a service 422*a*. In this example, the trigger module 431, proximate to the user 421, recognizes the request, performs its own function 400, and allows the request to be delivered 422*b* to a (remote location) service provider 423. In this case, its function 400 is to trigger a location action (401) at the location determination function. Thus, when the location service provider requests the location 425 after the service details 424 exchange, the location determination 426 has a head start in its calculations and can quickly return the location 427. This allows the location service 428 to be provided to the user more quickly, or to support location in systems that don't support location during voice calls or that utilize communications devices that do not support multi-tasking (i.e., simultaneous communications/operation of more than one function or application—for example a communication device who's user can be browsing a web site speaking on the telephone, but cannot simultaneously operate an application or function that access its location and share it).

In a variation of this example, the service request 422b could be delayed (by the trigger module 431) until later in the process, for example, after the location trigger 401.

As an example, consider a user dialing a concierge service to request directions to a nearby service. Some of today's cellular systems and communications devices do not accommodate location fixes during a voice call, since the necessary data exchanges are not supported during voice calls. The present invention recognizes the call as potentially requiring a location fix and allows the required data exchanges to complete before connecting the voice call. Once the call is in place, the call taker can query the location determination function for the user's location without requiring further data exchanges with the caller's handset.

Figure 5:
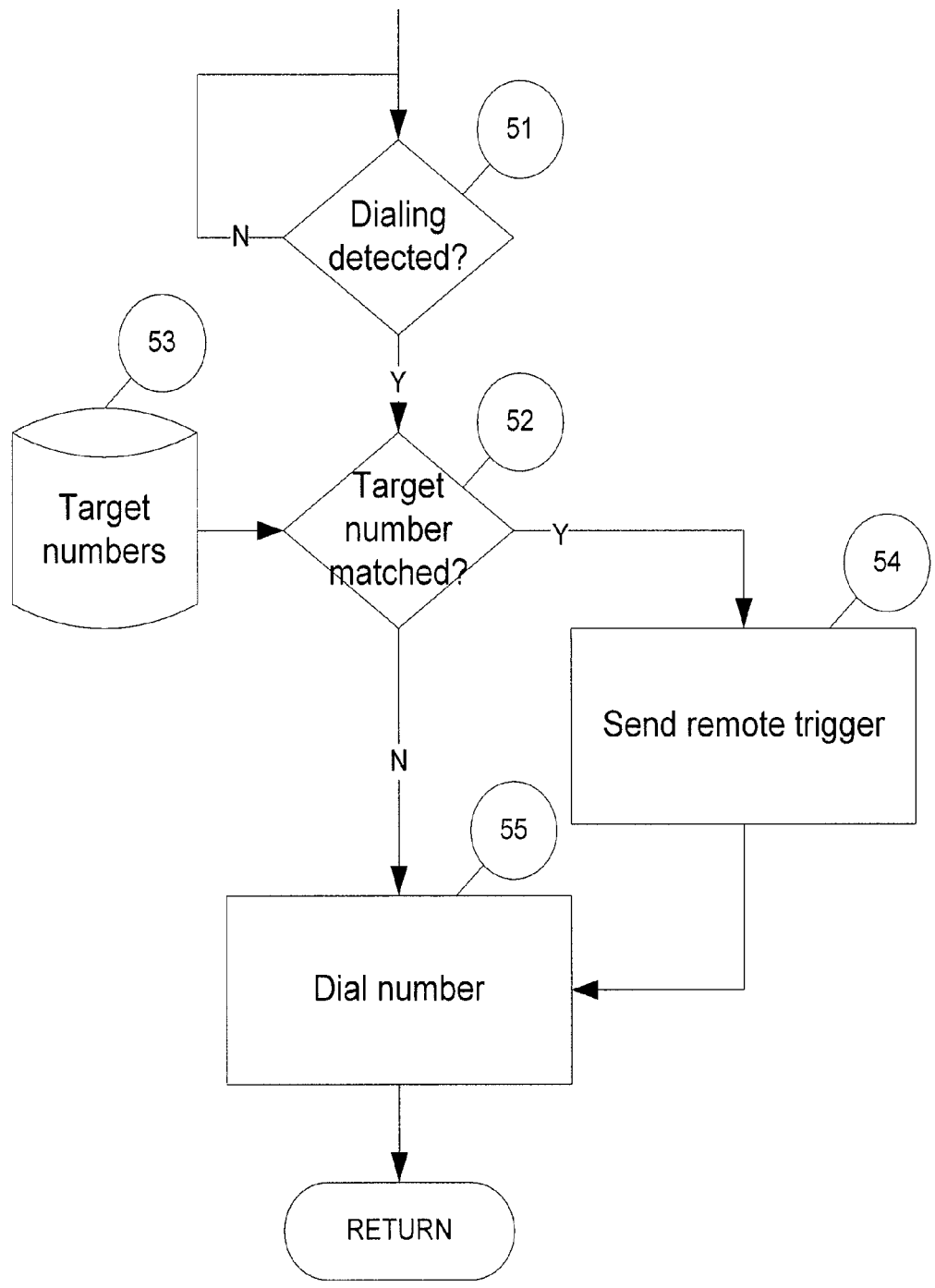

FIG. 5 is a diagram showing an exemplary logic performed by some embodiments of the present invention. The trigger module waits until a dialing event is detected 51. Once the event is detected, the dialed digits are inspected 52 and compared to stored target numbers 53. The stored target number represent those numbers previously identified as requiring triggers, e.g., those associated with services potentially needing location information such as the concierge service above. The stored trigger numbers can be located in the mobile phone, for example in the phone's address book, the location service provider's servers, or other storage entity, in a network-based storage system, or other location. If no match is found between the dialed number and the target numbers, then the dialing module is completed 55 with no further action. If the dialed number matches a target number, then the additional action of sending the remote trigger 54 is performed, in addition to dialing the number 55. Thereafter, the function is complete and will return to wait 51 for the next dialed number.

As an example of the invention in practice, a user may be dialing a roadside assistance number. In this case, the phone number may be tagged in the mobile phone address book as one associated with a location based service. Upon the user initiating a call to that number, the invention triggers a location request of the user, local to the mobile phone via, for example GPS, or a network-based location function. The results of the location request can be delivered to the call-taker with no further action needed and with minimal delay. This feature also addresses the situation in some networks where location determination under some circumstances can not be performed on a mobile phone while the user is engaged in a call.

In some embodiments, the invention makes use of a mobile phone's address book function/module. Individual entries in the address book may be flagged as being associated with location services. When the user selects that entry for dialing, in addition to the number being dialed, the trigger module is automatically invoked.

In some embodiments, the invention replaces or supplements the "dial" command of the phone interface with a new "dial" command that invokes the trigger module as well as the dialing module. In this case, knowledge of numbers that require a trigger may be flagged in the address book, or may be stored separately. Alternately, the trigger numbers may be stored remotely and accessed over a data channel as needed.

In some embodiments, the trigger module recognizes a prefix as associated with addresses of interest. For example, if the user appends the pound sign (#) to a dialed number, the trigger is invoked. Or the communications device could present a prompt to the user to "Call" or "Call with location" as an additional menu choice to initiate the dialing process. A similar method can be used with web addresses, (Uniform Resource Locators) URLs, or other address types. For example, data sessions with server having an address matching the form "map.x.x" (where "x" is a wildcard) could invoke the trigger module. Further, the trigger module may recognize certain partial strings of digits as associated with services of interest, for example, the first digit '9' implies an emergency 9-1-1 call, which has an associated location service.)

The above description describes dialing a voice call as the exemplary event that the invention monitors. However, the invention is also applicable to other communications technologies, including messaging, for example, Short Message Service (SMS) exchanges, data calls, data accesses. For instance, the trigger could be associated with a short messaging service Short Code or particular content of a text message to the Short Code. In this example, whenever the user sends a text message or particular content to the short code, the location trigger is invoked immediately upon sending or typing the short code or content of the message (e.g., users types "FIND COFFEE" to send to 34567 and the trigger module initiates the location process as part of the message being typed or upon start of the sending process because it recognizes FIND within the content of the message or the destination number). Other call triggers besides phone numbers may also be used, including any identifier that could be associated with a service, for example, a network address or URL. Furthermore, the invention is not limited to a mobile phone, rather, any mobile computing device or any computer may be used.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for initiating a service comprising:
   initiating a communication to a destination according to an address of the destination;
   detecting said address during initiating of said communication;
   determining whether said detected address is associated with a trigger function;
   delaying establishing said communication to the destination;
   transmitting a request for the service when said detected address is associated with a trigger function, wherein said request for the service is separate from said communication; and establishing said communication to the destination, after the request for service is transmitted, wherein said determining whether said detected address is associated with a trigger function comprises appending a prefix to said address and detecting said prefix as the trigger function.

2. The method of claim 1, wherein initiating a communication to a destination comprises dialing a phone number of the destination by a mobile phone.

3. The method of claim 2, wherein determining whether said detected address is associated with a trigger function comprises accessing stored phone numbers to check whether the dialed phone number is tagged as being associated with the service.

4. The method of claim 3, wherein the stored phone numbers are stored in an address book of the mobile phone.

5. The method of claim 3, wherein the stored phone numbers are stored remote from the mobile phone.

6. The method of claim 2, wherein said determining whether said detected address associated with a trigger function comprises replacing or supplementing a dial command of the mobile phone with a new dial command that invokes said triggering of the request for the service as well as said dialing of the phone number of the destination.

7. The method of claim 2, wherein said determining whether said detected address is associated with a trigger function comprises associating partial strings of digits of the phone number to the service and detecting the partial strings of digits.

8. The method of claim 1, wherein initiating a communication to a destination comprises accessing a website according to the web address of the destination.

9. The method of claim 1, wherein the service is a location service.

10. The method of claim 1, wherein said communication to the destination is initiated by one or more of the group consisting of a mobile phone, a mobile computing device, and a computer.

11. The method of claim 1, wherein said communication is a Short Message Service (SMS).

12. The method of claim 1, wherein said communication is a data access.

13. A mobile device comprising:
a dialing module for initiating a communication to a destination according to an address of the destination;
a memory for storing a plurality of addresses, each address associated with a service; and
determining whether said detected address is associated with a trigger function;
a triggering module for detecting said address during initiating of said communication and transmitting a request for the service according to said association, wherein said request for the service is separate from said communication, wherein the dialing module is configured to delay establishing said communication to the destination and to establish said communication to the destination, after the request for service, is transmitted, wherein said determining whether said detected address is associated with a trigger function comprises appending a prefix to said address and detecting said prefix as the trigger function.

14. A method for initiating a service comprising:
initiating a communication to a destination according to an address of the destination;
detecting said address during initiating of said communication;
determining whether said detected address is associated with a trigger function;
delaying establishing said communication to the destination;
transmitting a request for the service when said detected address is associated with a trigger function, wherein said request for the service is separate from said communication; and
establishing said communication to the destination, after the request for service is transmitted,
wherein initiating a communication to a destination comprises dialing a phone number of the destination by a mobile phone, and wherein said determining whether said detected address associated with a trigger function comprises replacing or supplementing a dial command of the mobile phone with a new dial command that invokes said triggering of the request for the service as well as said dialing of the phone number of the destination.

15. The method of claim 14, wherein said determining whether said detected address is associated with a trigger function comprises appending a prefix to said address and detecting said prefix as the trigger function.

16. The method of claim 14, wherein determining whether said detected address is associated with a trigger function comprises accessing stored phone numbers to check whether the dialed phone number is tagged as being associated with the service.

17. The method of claim 16, wherein the stored phone numbers are stored in an address book of the mobile phone.

18. The method of claim 17, wherein the stored phone numbers are stored remote from the mobile phone.

19. The method of claim 14, wherein initiating a communication to a destination comprises accessing a website according to the web address of the destination.

20. The method of claim 14, wherein said communication to the destination is initiated by one or more of the group consisting of a mobile phone, a mobile computing device, and a computer.

* * * * *